United States Patent [19]

Imagawa et al.

[11] Patent Number: 4,491,385

[45] Date of Patent: Jan. 1, 1985

[54] CONSTRUCTION FOR HOLDING OPTICAL FIBERS

[75] Inventors: Kyoshiro Imagawa; Shiro Sakuragi; Mitsunori Saitoh, all of Kyoto, Japan

[73] Assignee: Agency of Industrial Science & Technology, Tokyo, Japan

[21] Appl. No.: 396,473

[22] Filed: Jul. 8, 1982

[30] Foreign Application Priority Data

Jul. 10, 1981 [JP] Japan ................................ 56-107138

[51] Int. Cl.³ .............................................. G02B 5/14
[52] U.S. Cl. ................................................. 350/96.20
[58] Field of Search ............... 350/96.15, 96.18, 96.20, 350/96.21

[56] References Cited

U.S. PATENT DOCUMENTS 4,142,777 3/1979 Gauthier et al. ................. 350/96.21
4,198,119 4/1980 Uberbacher ...................... 350/96.20
4,215,937 8/1980 Borsuk ............................. 350/96.21 X Primary Examiner—John D. Lee
Assistant Examiner—Akm E. Ullah
Attorney, Agent, or Firm—Wenderoth, Lind & Ponack

[57] ABSTRACT

A construction for holding optical fibers, in which at least one of the ends of an optical fiber in a cable is a free end which is slidably and rotatively mounted to a hand piece at an end of the cable so as to prevent breakage of the optical fiber during bending of the cable.

6 Claims, 2 Drawing Figures

CONSTRUCTION FOR HOLDING OPTICAL FIBERS

BACKGROUND OF THE INVENTION

1. Field of the Invention

The present invention relates to a construction for holding both ends of optical fibers inserted into a cable on end members of said cable.

2. Description of the Prior Art

In the conventional constructions of this type, both ends of optical fibers have been fixedly mounted on end members of a cable regardless of whether the optical fibers are of the single core type or the multiple core type. In this case, the length of the optical fibers is always larger than the length of the cable so that there is some slack in the optical fibers, because it is feared that if the length of optical fibers were equal to the length of the cable the optical fibers would be broken by axial forces by the action of stretching the cable which forces would be generated from bending of the cable and would be applied through the points at which optical fibers are fixedly mounted on end members of the cable.

However, if the length of optical fibers is larger than the length of a cable so that optical fibers may be payed out with some slack, in the cable, a decrease of in the transmission factor in the optical fibers according will result, since the transmission factor is inversely proportional to the length of the optical fibers. Accordingly, such a construction is undesirable for an optical transmission channel.

SUMMARY OF THE INVENTION

It is an object of the present invention to provide a useful construction for holding optical fibers which can prevent a breakage of the optical fibers owing to bending thereof without making the length of optical fibers larger than the length of a cable.

DESCRIPTION OF THE PREFERRED EMBODIMENTS

Figure 1:
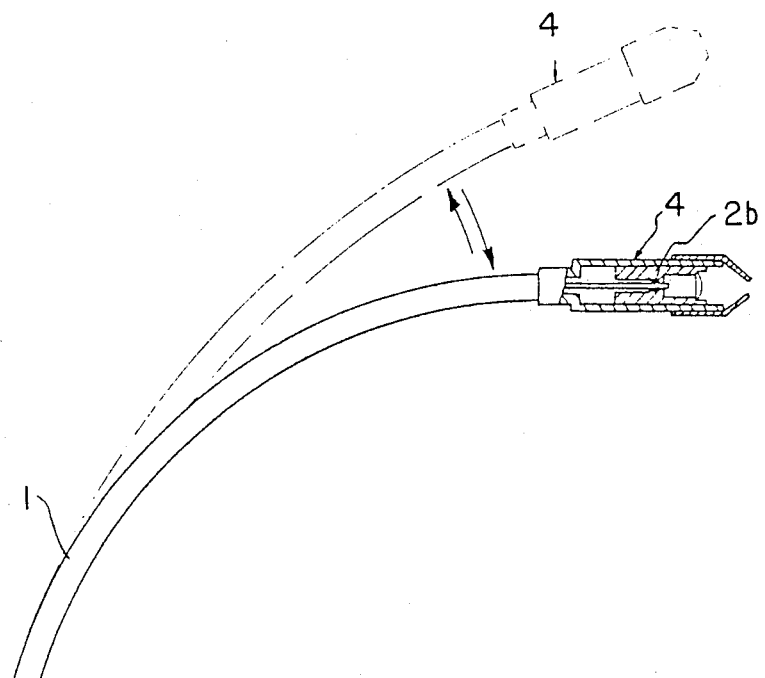
FIG. 1 is a general view showing one of the preferred embodiments of the present invention.
Figure 2:
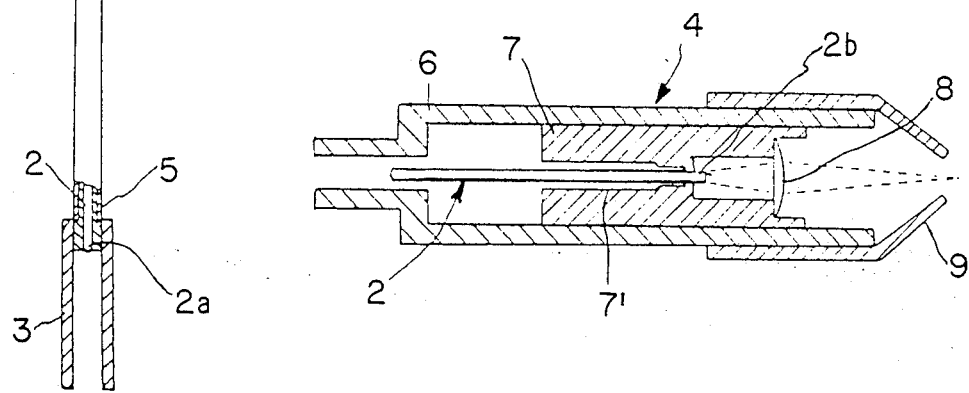
FIG. 2 is a cross section showing the main parts in detail.

One of the preferred embodiments of the present invention will be described below by reference to the drawings. Referring now to FIG. 1 showing one of the preferred embodiments of a construction for holding optical fibers according to the present invention, reference numeral 1 designates a cable into which optical fibers such as infrared fibers of clad type 2 are inserted. Reference numerals 3 and 4 designate end members of said cable 1 connected with the end portions of said cable 1. In the preferred embodiment of the present invention as shown member 3 is an attachment for connecting with a source of laser rays (not shown) and member 4 is used as a hand piece end 2a of said optical fiber 2 is fixedly mounted on said attachment 3 by means of an appropriate locking means 5 and the other end 2b of said optical fiber 2 is fixedly inserted into a hole 7' of a columnar holding member 7, which is slidably and rotatably inserted in a housing 6 of said hand piece, as shown in FIG. 2. Accordingly, end 2b is a free end, which is slidable and rotatable, (not fixedly) mounted in said housing 6 of said hand piece. Reference numeral 8 designates a condensing lens mounted on the pointed end of said holding member 7, reference numeral 9 designating a protective cover put on the pointed end of said housing 6 of said hand piece.

According to the above described construction, although one end 2a of the optical fiber 2 is fixedly mounted, said other end 2b of said optical fiber 2 is a free end. Thus, said optical fiber 2 can be effectively prevented from breaking even though cable 1 is bent as shown in FIG. 1 because the sliding motion of said holding member 7 holding said end 2b in housing 6 of said hand piece prevents a stretching force owing to the bending of said cable 1 from acting upon said optical fiber 2. Consequently, the cable can be bent to an extent substantially larger than those in which both ends of the optical fibers are fixedly mounted.

In addition, although end 2b of optical fiber 2 is fixedly inserted into a holding member 7 for holding optical fibers and said holding member 7 for holding optical fibers is slidably and rotatably mounted in a housing of a hand piece in the above described preferred embodiment of the present invention, it also goes without saying that in another embodiment said holding member 7 for holding optical fibers could be fixedly mounted on said housing 6 of said hand piece and said end 2b of said optical fiber 2 could be rotatably and slidably inserted in said holding member 7 for holding optical fibers. Furthermore, although optical fibers of clad type are used in the above described preferred embodiment of the present invention, also optical fibers of air clad type may be used. In this case, it is necessary that said holding member 7 for holding optical fibers be made of materials having a refractive index smaller than that of the core materials of said optical fiber 2. For example, said holding member 7 is preferably made of KRS-6 when core materials of said optical fibers 2 are made of KRS-5.

In addition, although the end of said optical fiber in hand piece 4 is a free end, end 2a in attachment 3 may be a free end. Furthermore, although one end is fixedly mounted while the other end is a free end in the above described preferred embodiment of the present invention, both ends may be free ends.

As described above, according to the present invention, at least one of the ends of an optical fiber inserted in a cable is a free end. Accordingly, the optical fiber can be prevented from breaking owing to bending even though the length of the optical fiber is equal to the length of the cable and thereby the construction of the present invention has the effect of maximizing the transmission factor while preventing the optical fibers from breaking.

What is claimed is:

1. An optical fiber device, comprising:
    a hand piece; a longitudinally extending cable having a longitudinal axis; and an optical fiber extending longitudinally in said cable, one end of said cable and a corresponding free end of said optical fiber being mounted in said hand piece, such that said corresponding end of said fiber is longitudinally slidable and rotatable about said longitudinal axis, relative to said hand piece.

2. An optical fiber device as in claim 1, further comprising a columnar holding member having a longitudinally extending bore, longitudinally slidable, and rotatable about said longitudinal axis, relative to said hand piece, said corresponding free end of said optical fiber being inserted in said bore and fixed to said holding member.

3. An optical fiber as in claim 2, further comprising a condenser lens fixed to said holding member in fixed relative position to the tip of said corresponding free end of said optical fiber in alignment with said longitudinal axis.

4. An optical fiber device as in claim 1, further comprising a columnar holding member having a longitudinally extending bore, fixed in said hand piece said corresponding free end of said optical fiber being longitudinally slidably mounted in said bore, said corresponding free end being rotatable in said bore about said longitudinal axis.

5. An optical fiber device, comprising:
a hand piece;
a longitudinally extending cable having a longitudinal axis, fixed at one end thereof to said hand piece;
a columnar holding member having a longitudinal extending bore, longitudinally slidable, and rotatable about said longitudinal axis, relative to said hand piece; and
an optical fiber extending longitudinally in said cable, said optical fiber having a free end at said one end of said cable inserted in said bore and fixed to said holding member for sliding and rotative movement therewith in said hand piece.

6. An optical fiber as in claim 5, further comprising a condenser lens fixed to said holding member in fixed relative position to the tip of said free end of said optical fiber in alignment with said longitudinal axis.

* * * * *